United States Patent [19]

Pedigo

[11] Patent Number: 4,701,945

[45] Date of Patent: Oct. 20, 1987

[54] CARRIER CURRENT TRANSCEIVER

[76] Inventor: Michael K. Pedigo, 158 South Walnut St., Southport, Ind. 46227

[21] Appl. No.: 658,886

[22] Filed: Oct. 9, 1984

[51] Int. Cl.$^4$ .......................................... H04M 11/00
[52] U.S. Cl. ....................................... 379/66; 379/64; 340/310 A
[58] Field of Search ................. 179/2.51; 370/11, 120, 370/76, 71, 72, 73; 340/310 R, 310 A, 310 CP; 381/14; 379/64, 65, 66

[56] References Cited

U.S. PATENT DOCUMENTS

| | | | |
|---|---|---|---|
| 3,478,169 | 11/1969 | Saite | 381/14 |
| 3,909,618 | 9/1975 | Fujii et al. | 179/2.51 |
| 3,949,172 | 4/1976 | Brown et al. | 179/2.51 |
| 4,058,678 | 11/1977 | Dunn et al. | 179/2.51 |
| 4,495,386 | 1/1985 | Brown et al. | 179/2.51 |
| 4,514,594 | 4/1985 | Brown et al. | 179/2.51 |
| 4,534,054 | 8/1985 | Maisel | 381/4 |

Primary Examiner—Robert Lev
Attorney, Agent, or Firm—Woodard, Emhardt, Naughton, Moriarty & McNett

[57] ABSTRACT

A carrier current telephone system is provided for buildings. Transceivers are located where desired. The transmitter portion includes means for establishing a carrier signal and applying the same to the AC circuits in the building. Further means are provided for generating a subcarrier signal which is encoded on the carrier signal by frequency modulation of the carrier. Further means are provided for encoding the audio or data signal upon the subcarrier signal by frequency modulation of the subcarrier. Exclusive-OR gates are used in a voltage controlled oscillator for the subcarrier signal generator. Unique phase lock loop FM demodulators are used. Each comprises one CMOS 4070B exclusive-OR gate package, five resistors, one potentiometer, and three capacitors, with one of the exclusive-OR gates performing the phase detector function.

28 Claims, 8 Drawing Figures

CARRIER CURRENT TRANSCEIVER

BACKGROUND OF THE INVENTION

1. Field of the Invention

This invention relates generally to communications and more particularly to a system for sending and receiving audio and data signals by conduction through alternating current (AC) power lines installed in a building or group of buildings.

2. Description of the Prior Art

The construction of modern buildings usually requires inclusion of wiring for electrical circuits for providing AC power at various locations in the building. Where the buildings are to be occupied by people, it is common to have additional wiring for telephone outlets at various locations in the building. While this is comparatively easy to do during the construction of a building, it involves effort and expense for labor and materials. For existing buildings, when it is desired to add telephone outlets, it is usually inconvenient to do, particularly if the wiring to them is to be concealed. Sometimes it is very difficult or impossible to provide concealed wiring to a desired location for an outlet.

It is an object of the present invention to make it easy to provide outlets at desired locations in a building for telephone and other wired communications usage.

SUMMARY OF THE INVENTION

Described briefly, according to one embodiment of the present invention, a line carrier current telephone system is provided for a building. Usually one main or base unit transceiver is employed. The transmitter portion includes means for establishing a carrier signal and applying the same to the AC circuits in the building. Further means are provided for generating a subcarrier signal which is encoded on the carrier signal by frequency modulation of the carrier. Further means are provided for encoding the audio or data signal upon the subcarrier signal by frequency modulation of the subcarrier. Remote units or remote telephones are used which can be plugged into any AC outlet of the building. Each remote unit has an outlet socket for reception of a standard telephone jack plug. Each remote unit is able to demodulate the subcarrier and provide the audio or data information at the telephone jack for a conventional telephone connected thereto. Each remote unit is also able to take audio information from the telephone and frequency modulate a subcarrier for frequency modulation of a carrier for delivery of this information to the base unit transceiver which can then demodulate it for delivery to the external telephone line. Unique phase lock loop demodulators are used in the transceivers. Each of these uses an exclusive-OR gate package. The phase detector function is performed by an exclusive-OR gate. The filter is a passive R-C circuit, and the voltage controlled oscillator also uses exclusive-OR gates, resistors and capacitors.

DESCRIPTION OF THE PREFERRED EMBODIMENT

Figure 1:
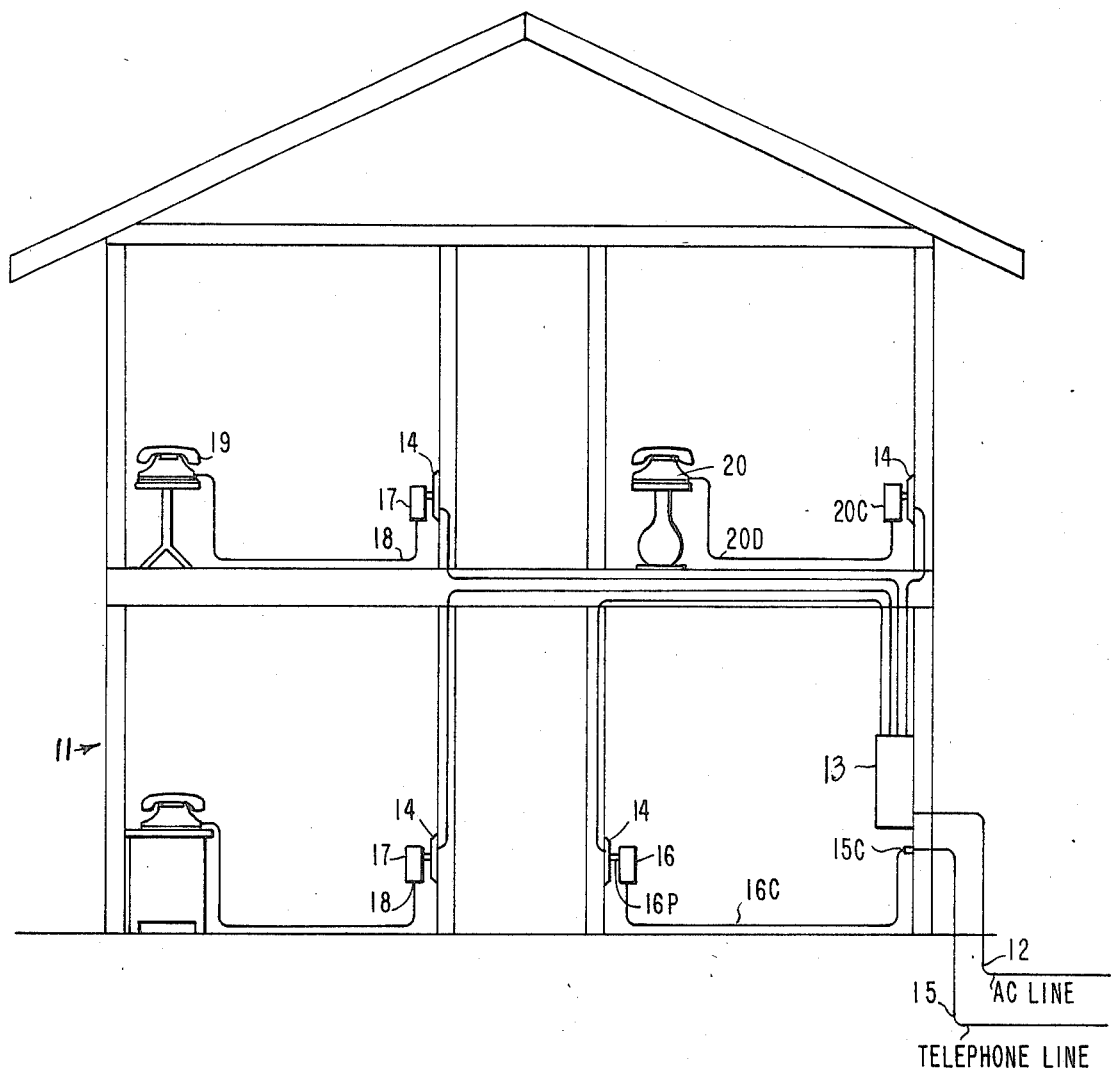
FIG. 1 is a simplified diagram of a building having a typical embodiment of the present invention installed in it.

Referring to the drawings in detail, and particularly FIG. 1, a two-story house 11 is shown with two rooms upstairs and two rooms downstairs. Electrical service is provided through underground cable 12 to the circuit breaker box 13. Four electrical circuits are provided from the box 13, one to each of the four rooms of the house. Each of these serves a standard wall outlet 14 having sockets, one or more of which could be used for lamps or other electrical devices, and one for the transceiver of the present invention. Telephone service is provided from the underground cable 15 to the in-house connector 15C. Base unit 16 of the present invention is connected to the AC circuitry of the house by plugging it into any of the wall outlets. For convenient accessibility to the telephone line, the base unit is plugged into a socket in the wall outlet 14 in the same room as the telephone line enters. Cord 16C from the base unit is connected to the telephone line connector 15C.

Two satellite or remote units 17 of the present invention are shown, one plugged into a socket at each of two outlets 14. Each of these units 17 has a standard telephone jack 18 to which the wire from a telephone set 19 is connected. Additional units 17 can be plugged into sockets at the other two outlets, when desired, according to the present invention.

Instead of using a remote unit and a separate telephone set 19, the present invention is applicable to use with and in a carrier-current telephone 20 which can be supplied by alternating current from a voltage step-down power converter 20C directly plugged into a conventional socket of any of the electrical power outlets 14. Where the present invention is used in one or more remote carrier-current telephones, the telephone such as 20 is a complete telephone set. The remote telephones communicate with the base unit in a similar manner as the remote units 17, as will be described. Each remote unit has a carrier current transceiver capable of frequency modulating a subcarrier with the desired audio signal, and capable of frequency modulating a carrier by this subcarrier. Likewise, each remote telephone is capable of demodulating the carrier and subcarrier signal from the base unit. Each remote telephone incorporates a handset speaker and a handset microphone for acoustical energy conversion, as well as, a number dialing system, a hook switch and a ringer. The number dialing system is either a keyboard-activated pulse dial generator or a keyboard-activated DTMF (dual tone) generator, or both.

Base Unit

Figure 2:
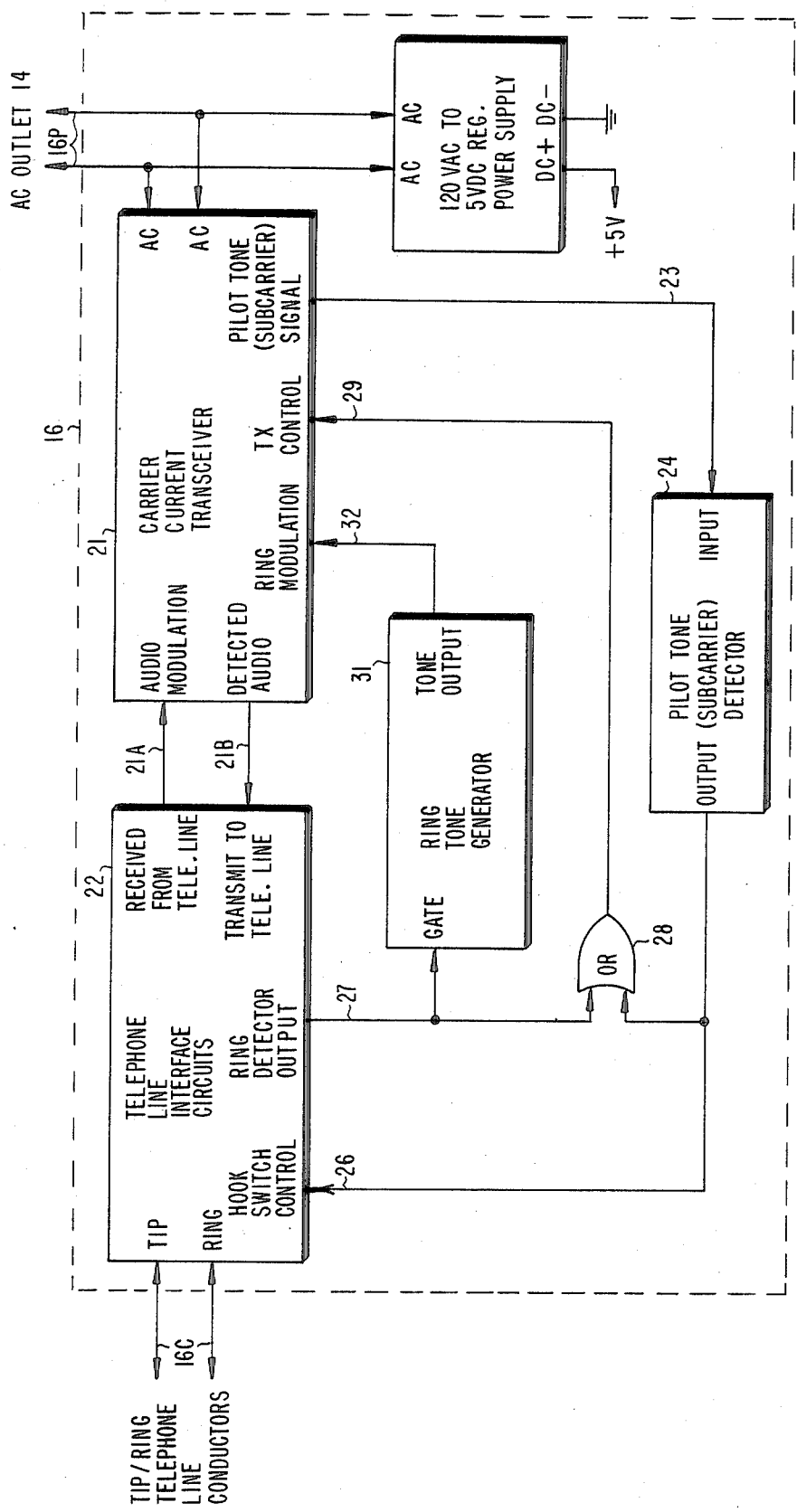
FIG. 2 is a block diagram of the base unit according to a typical embodiment of the present invention.

Referring now to FIG. 2, this block diagram shows the base unit, and how the carrier current transceiver 21 thereof will interface with the telephone line 16C. Block 22, called "telephone line interface circuits", is largely conventional, and includes a hook switch control. The hook switch control will open and close the conductive path between the tip and ring conductors of the telephone line 16C. When a telephone is considered off-hook, there is a conductive path between tip and ring conductors. When it is on-hook and not in use, there is an open path between tip and ring conductors. To control this in base unit 16, a pilot tone is used. The pilot tone in the practice of the present invention is actually a subcarrier signal generated in and received from the remote unit such as 17 or remote telephone such as 20. When the pilot tone is present on conductor 23, it is detected by the pilot tone or subcarrier detector 24 and its output goes to the telephone line interface circuits 22 and causes the hook switch to assume the off-hook condition, causing a conductive path between tip and ring.

The subcarrier signal not only controls the hook switch, but it also will control the transmitter for the base unit. In essence, the remote unit transmits a carrier and then a subcarrier. The subcarrier is detected at 24 in the base unit, and that will cause the phone line to be seized or go off-hook, and also cause the transmitter at the base unit to become on so that there is a full duplex operation.

The telephone line interface circuits 22 have a ring detector to produce an output of line 27 which does two things. One of them is through one input of an OR gate 28 whose output on line 29 will turn on the transmitter to the base unit. The ring detector output on line 27 will also gate a ring tone generator 31 producing output on line 32 to the base unit transceiver 21. There it modulates a subcarrier which, in-turn, modulates the carrier. The modulated carrier representing the specific ring tone is transmitted from the base unit to the remote unit through the house wiring. The remote unit will detect that tone and then will output a loud ring signal.

Another aspect of the pilot tone system which uses the subcarrier as the control, will now be described. When the remote unit such as 17 which has a telephone such as 19 connected to it, is dialing, and it is in a pulse dial mode, or if there is a remote telephone such as 20 that is dialing in the pulse dial mode, there is a need to get that information back to the base unit. The pilot tone or the subcarrier has the capability of doing that too. As stated above, when the pilot tone is present, it closes the conductive path between the tip and ring conductors. In pulse dialing, that conductive path is repetitively opened at a certain time interval, at a certain repetition rate. So by turning on and off the pilot tone at a remote unit 17 or remote telephone 20, the effect of pulse dialing is achieved.

For the dual tone, DTMF, form of dialing, since the dual tone is actually an audio signal, it is effectively summed into the normal audio path that is used in the remote unit and base unit carrier current transceivers, which will be described in detail hereinafter.

Remote Unit

Figure 3:
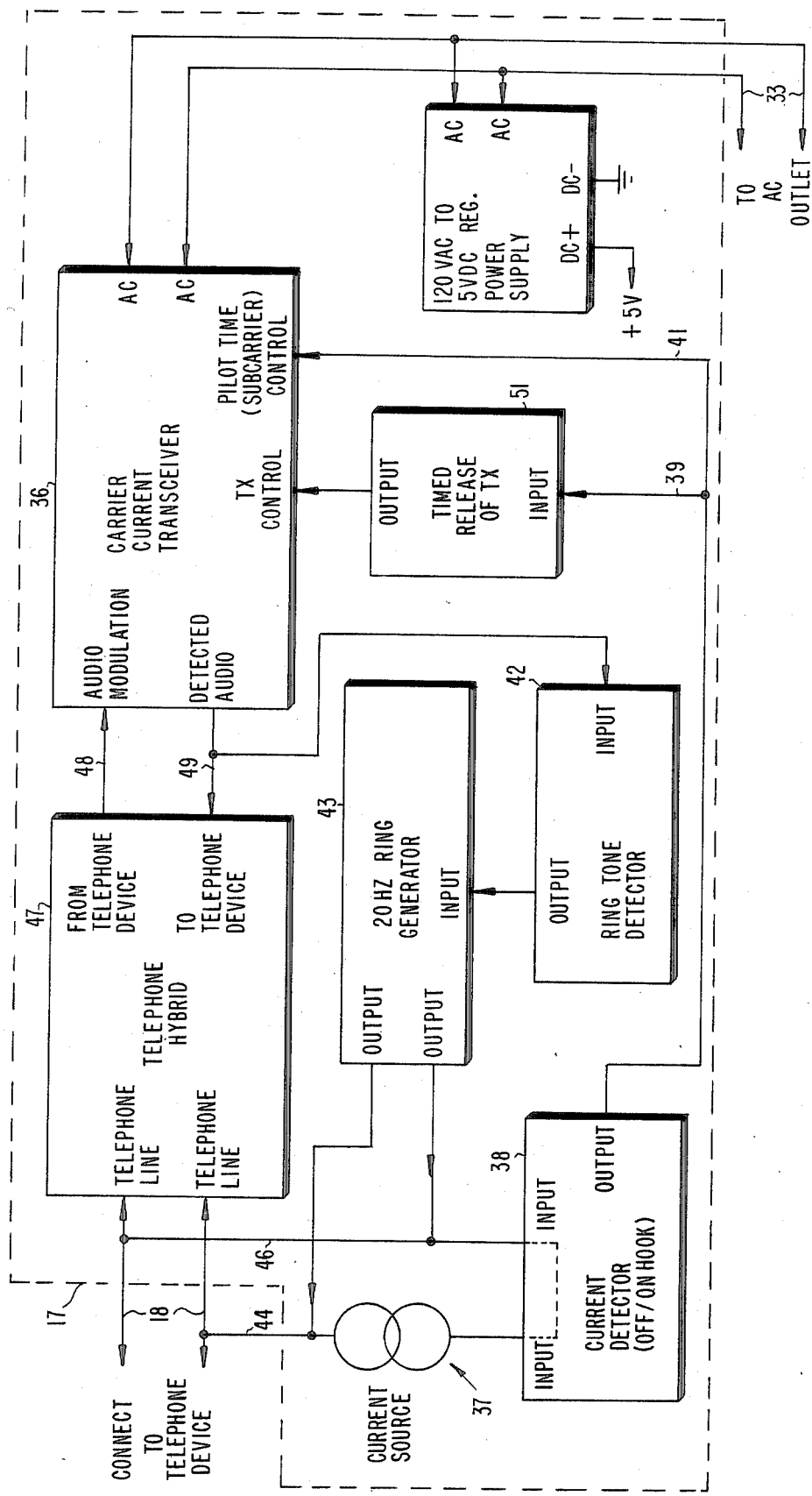
FIG. 3 is a block diagram of a remote unit according to a typical embodiment of the present invention.
Figure 4:
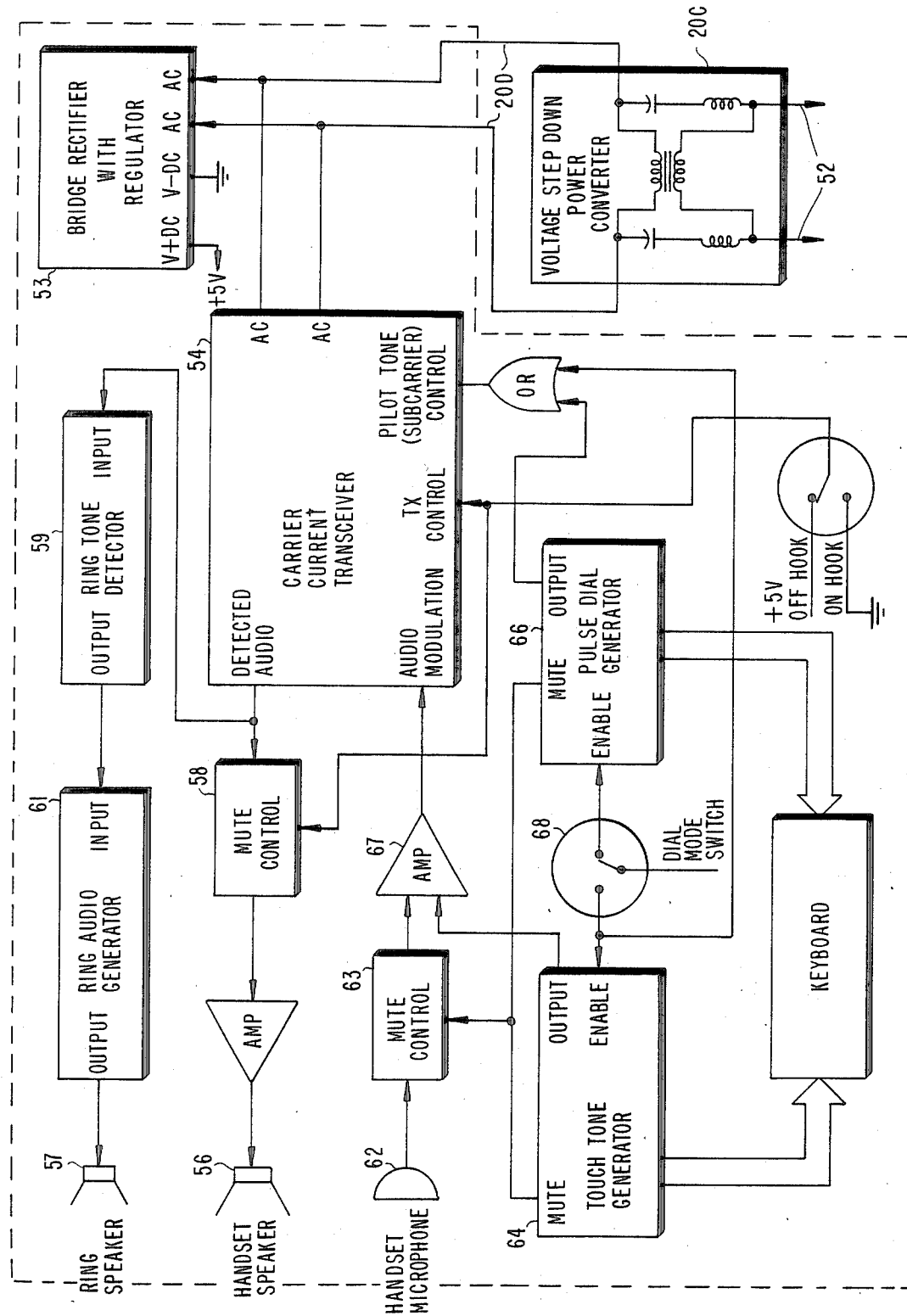
FIG. 4 is a block diagram of a remote telephone according to a typical embodiment of the present invention.

Referring now to FIG. 3, the remote unit 17 is a unit that has a socket 18 which receives a plug wired to a standard telephone. It has prongs as at 33 whereby it plugs into the AC line. In contrast, the remote telephone 20 of FIGS. 1 and 4 is actually a complete telephone device that plugs into the AC line through a converter. Further referring to FIG. 3, a carrier current transceiver 36 of the present invention is involved and it has various signals coming to and from it. FIG. 3 shows how a standard telephone with all its features and functions, can be adapted into the carrier current system such that all those standard features and functions will be transmitted and received from the base unit of FIG. 2 and down through the phone network to the central office. One function is the hook switch control described above with reference to the base unit. With a standard phone, when one picks-up the receiver, it will draw current from the two conductors that are used for communications. In FIG. 3 there is a high impedance current source 37 for supplying current which the phone will draw. It has two functions. First, it activates the microphone and speaker in the standard telephone, as well as it would activate a tone pad for a DTMF type tone dialing. Secondly, it supplies the current detector 38, and when the telephone goes off-hook, the current detector will detect the increase in current that is being drawn through the device and will signal to the carrier current transceiver 36 that the telephone is off hook. When that happens, it will cause the transmitter to become active and also cause the pilot tone to become active with the subcarrier signal. Again, when the transmitter becomes active and the pilot tone becomes active, that causes the base unit to go into the off hook state and it detects the subcarrier tone and closes the path between the tip and ring conductors.

Another funtion of the telephone is the ring. As described above, a special tone is sent to the remote unit, or remote telephone which identifies that a ring is coming. The remote unit has a ring tone detector 42 which detects that tone and, when it is active, it will gate a twenty Hz ring generator 43. A twenty Hz signal is typically used for a tone for a ring drive for a standard telephone. This twenty Hz ring generator is outputted to the lines 44, 46 that go to the jack 18 for connection to the plug on the cord of a standard phone.

The "telephone hybrid" 47 of FIG. 3 is a typical system for isolating the transmit signal from the receive signal fo the standard telephone. It takes the transmit signal off one line and the receive signal off the other. The base unit of FIG. 2 has the same feature in its telephone line interface circuits 22.

The time release block 51 is for reliable pulse dialing. Immediately upon detection of a pulse-dialing command, the transceiver turns off and then on, the subcarrier. The time release circuit delays turn-off of the transmitter following turn off of the subcarrier, so that the transmitter will not turn off during pulse dialing, before the subcarrier comes back on. Thus there is no interference with the dialing function. When a person hangs-up, the subcarrier immediately goes off. After expiration of the period of the time release, the transmitter goes off, and it thereby actually hangs up.

Remote Telephone

Referring now to FIG. 4, the plug-in remote telephone 20 is like the remote unit 17 except that it has all features of a telephone, including a handset speaker and a handset microphone for listening and talking, and also a ring speaker to generate the "ring". Block 20C is an AC transformer with RF coupling between primary and secondary. Prongs 52 thereof are provided to plug into and mount the transformer in an AC outlet, as at 14 in FIG. 1. Here the AC voltage, typically 110, is first stepped down through the transformer to a low voltage, primarily as a safety precaution, such that there are no hazardous voltages in the unit. The transformer assembly inckudes a series tuned circuit to pass the RF power. It is a low Q circuit to block 60 Hz signals, but will readily pass the carrier which can be between 100 kHz and 550 kHz. The transformer will effectively pass those frequencies through an AC cord 20D to the carrier current transceiver 54 of the telephone 20. But still it will isolate the primary from the secondary through the capacitors. The secondary of the transformer also is connected to the voltage regulator/rectifier circuit 53, to provide a power supply. The carrier current transceiver 54 is the center device and is important to control all the other features.

The detected audio from the carrier current transceiver is coupled to the handset speaker 56 and to the ring speaker 57. There is a mute circuit 58 ahead of the amplifier to the handset speaker, to mute the speaker when one is in the on-hook state. The detected audio for the ring goes to the ring tone detector 59 such as described above. Its output goes to a ring audio generator 61 which generates a specific tone that would sound like a telephone ring, which drives at a high level, the ring speaker.

The handset microphone 62, goes through mute circuitry 63 which is controlled by the touch tone generator 64, as well as the pulse dial generator 66, to mute the microphone when one is dialing.

The handset microphone output goes to an amplifier 67. The touch tone generator signal also goes to that amplifier. The amplifier output modulates the subcarrier which then modulates the carrier in the carrier current transceiver 54 according to my invention. The modulated carrier output is sent to the base unit through the AC lines 20D, transformer 52, and building wiring. A dial mode switch 68 is available to select the pulse dial or touch tone mode of dialing.

Transceiver; Transmission Section

Figure 5:
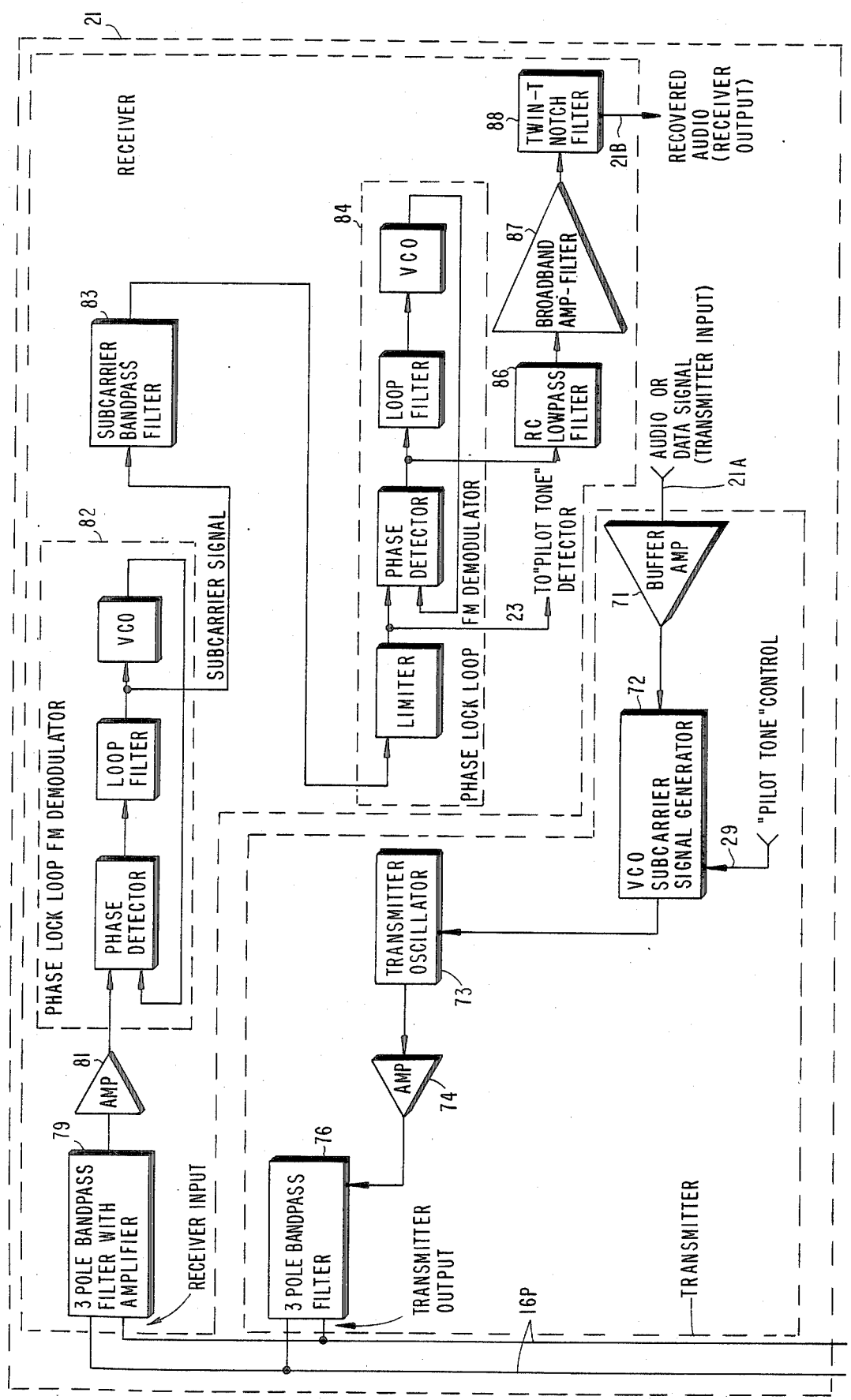
FIG. 5 is a block diagram showing a carrier current transceiver according to a typical embodiment of the present invention.
Figure 6:
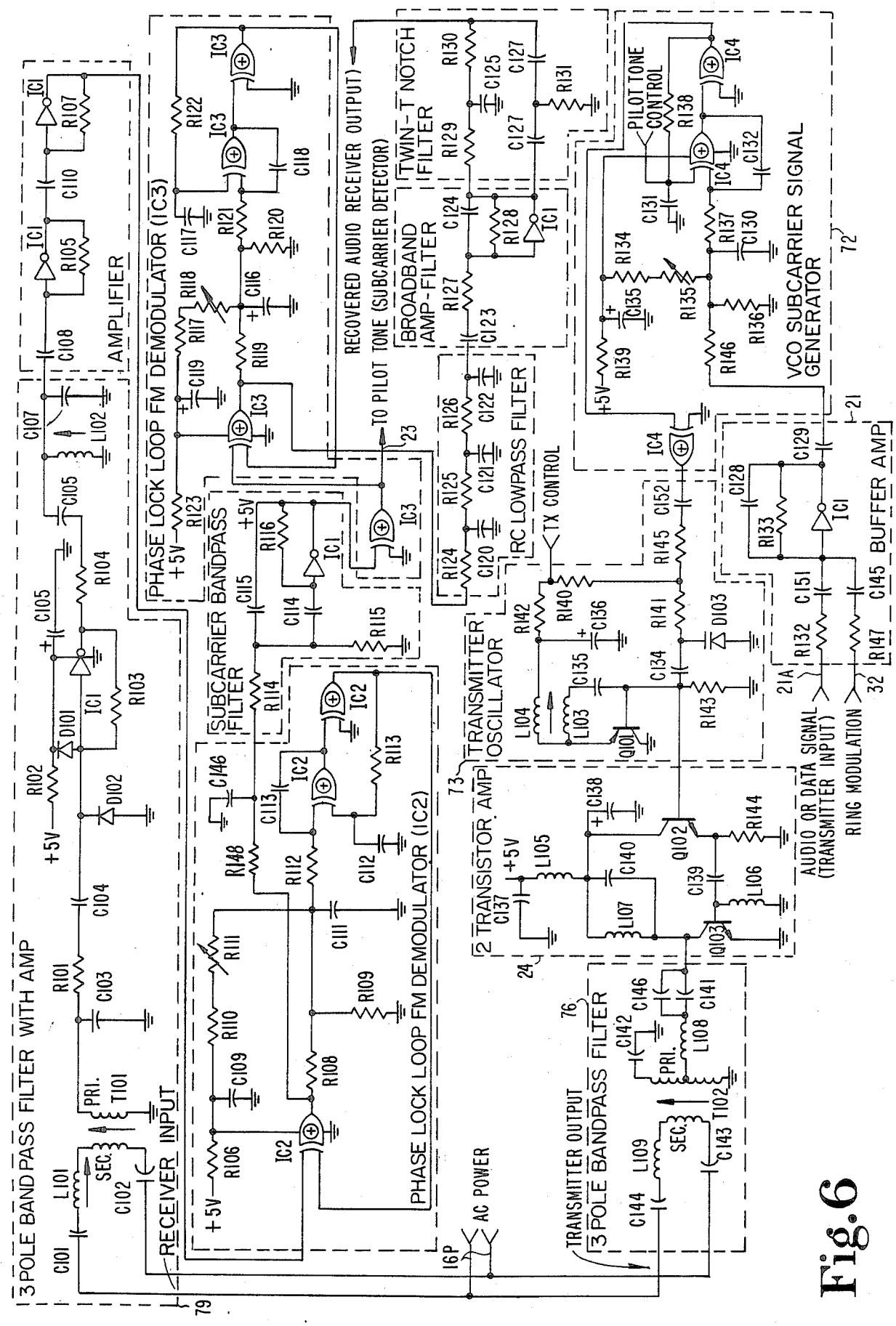
FIG. 6 is a schematic diagram of the carrier current transceiver.

Referring now to FIGS. 5 and 6, the carrier current transceiver of the present invention will be described. The same basic transceiver is used in both the base unit, the remote unit, and the remote telephone. For convenience in description, the transceiver will be described as employed for the base unit. An audio or data signal, for present purposes an audio signal, from telephone interface circuits 22 of FIG. 2, is passed on line 21A to the input of a buffer amplifier 71 made from one section of a standard integrated circuit device, more specifically a 4069UB hex NOT gate. This buffer amplifier modifies the harmonic content of the signal by emphasis of the high frequency components. The output of this buffer amplifier is connected to the input of a voltage controlled oscillator (VCO) 72 that is set at a free running frequency between 8 KHz and 15 KHz. The buffer amplifier output causes the frequency modulation of the VCO output. The VCO output is the subcarrier signal. This VCO 72 is made from three exclusive-OR gates within a standard 4070B CMOS quad exclusive-OR package.

The VCO output (subcarrier signal) is connected to a varactor diode tuned LC oscillator 73 and frequency modulates the output of this LC oscillator. The LC oscillator operates on a carrier frequency between 100 KHz and 550 KHz. The output of the varactor tuned LC oscillator 73 is the carrier signal and is buffered, amplified, and filtered through a two transistor amplifier circuit 74 with the associated passive components. The output of this transistor circuit is then balanced fed from the three pole bandpass filter 76 through prongs 16P plugged directly into the AC power lines socket of an outlet 14 of the building. In some instances, the output of transistor amplifier circuit 74 may be balanced fed to the secondary windings of a voltage step-down transformer device that has its primary windings connected to the AC power lines.

Transceiver - Receiver Section

The output signal from a transmission device as described above can be received and demodulated by a receiver as explained in the following. The signal has the following properties:

1. A carrier signal between 100 KHz and 550 KHZ.
2. A frequency modulation of this carrier signal by a subcarrier signal between 8 KHz and 15 KHz.
3. A frequency modulation of this subcarrier signal by the desired audio or data signal with a frequency spectral content between 300 Hz and 3 KHz.

The output signal from the transmission device, such as the transmitter of the transceiver of one of the remote units 17, for example, is coupled into the receiver of the base unit by connecting the input of the receiver, by means of prongs 16P, to the common AC power lines. Where the transceiver is part of a remote telephone, the coupling may be accomplished by connection of the receiver input to the secondary windings of a voltage step-down transformer device such as 20C (FIGS. 1 and 4) that has its primary windings connected to the common AC power lines as by prongs 52 for device 20C.

The receiver input signal is obtained from the AC line through prongs 16P of the plug received in a socket of outlet 14. The signal is first filtered with a bandpass filter with amplifier, 79. The filter is centered at the carrier signal frequency. This filter reduces undesired spectral components which include:

1. AC Power line noise.
2. Normal radio noise.
3. Undesired transmitter signals from transmission devices operating on undesired carrier signal frequencies. One of these undesired transmitter signals is from the transmission device that, together with this receiver device, is used to make a full duplex carrier current transceiver.

This bandpass filter is a 3 pole device that includes an active amplifier composed of one section of the CMOS 4069UB hex NOT gate package.

The signal, after the above mentioned filtering and amplification is then further amplified by an amplifier 81 composed of two sections of the same 4069UB hex NOT gate package.

This amplified signal is then demodulated to extract the subcarrier signal. Demodulation is achieved by means of a phase lock loop FM demodulator 82 which, according to a further feature of the present invention, is composed of three sections of a standard CMOS 4070B quad exclusive-OR gate package and the associated passive components.

The subcarrier signal is then bandpass filtered by an active filter 83 centered at the subcarrier frequency. This bandpass filter is constructed from one section of the sam 4069UB hex NOT gate package. After this filtering, the desired audio or data signal is demodulated from the subcarrier signal by use of another phase lock loop FM demodulator 84 composed of four sections of a CMOS 4070B quad exclusive-or gate package and the associated passive components.

The detected audio or data signal is then filtered to remove undesired spectral components, which include any significant subcarrier signal leakage. Filtering is done by means of a three section RC lowpass filter 86, a broadband filter 87 composed of another section of the 4069UB hex NOT gate package, and a twin T notch filter 88 tuned to the subcarrier signal frequency. The output of this filter at line 21B is the recovered audio signal. It is fed to the telephone interface circuitry for coupling to the telephone line 15, in the case of the base unit, or to the telephone jack 18 in the case of the remote unit to which the cord from a telephone set is plugged.

Referring now to FIG. 6, the resistors, capacitors and inductances which are discrete items not a part of a particular gate symbolized, are numbered with the prefixes R,C and L, respectively. The various gates used on a given integrated circuit device are given a device number with the prefix IC. Discrete transistors have the prefix designation Q. The transformers are given the prefix T.

The pilot tone control input is shown in block 72. The subcarrier signal from the remote unit or remote telephone is used as the pilot tone to communicate the ON/OFF hook condition to the base unit. As the remote unit goes OFF hook, its transmitter and subcarrier are activated. The base unit detects this subcarrier, causing a closed circuit condition between the tip and ring conductors (i.e.—off hook) and also causing the activation of the base unit transmitter. Likewise, when the remote unit goes from the OFF hook to the ON hook state, its transmitter carrier and subcarrier are deactivated. This causes the base unit to open the circuit beteeen the tip and ring conductors and also causes the deactivation of the base unit transmitter.

The pilot tone system is also used to transmit pulse dial information from the remote unit to the base unit. Pulse dialing is accomplished by repetitively opening and closing the conductive path between the tip and ring conductors at tha base unit. For example, if the number "3" is pulse dialed, the remote unit subcarrier is interrupted three times at a ten pulse per second rate. The base unit detects the interrupted subcarrier signal, causing the interruption of the circuit between the tip and ring conductors three times at the same ten pulse per second rate. The pilot tone detector is coupled to the output of the phase lock loop FM demodulator such as shown at IC 3 in FIG. 6. The values of the components for receiving a subcarrier frequency of 9.8 KHz, receiving a carrier frequency of 194 KHz, transmitting a subcarrier frequency of 12.2 KHz and transmitting a carrier frequency of 361 KHz are shown in Exhibit A hereto.

While the system has been described for full duplex operation, it can be modified for half duplex or simplex operation.

PHASE LOCK LOOP FM Demodulator

Figure 7:
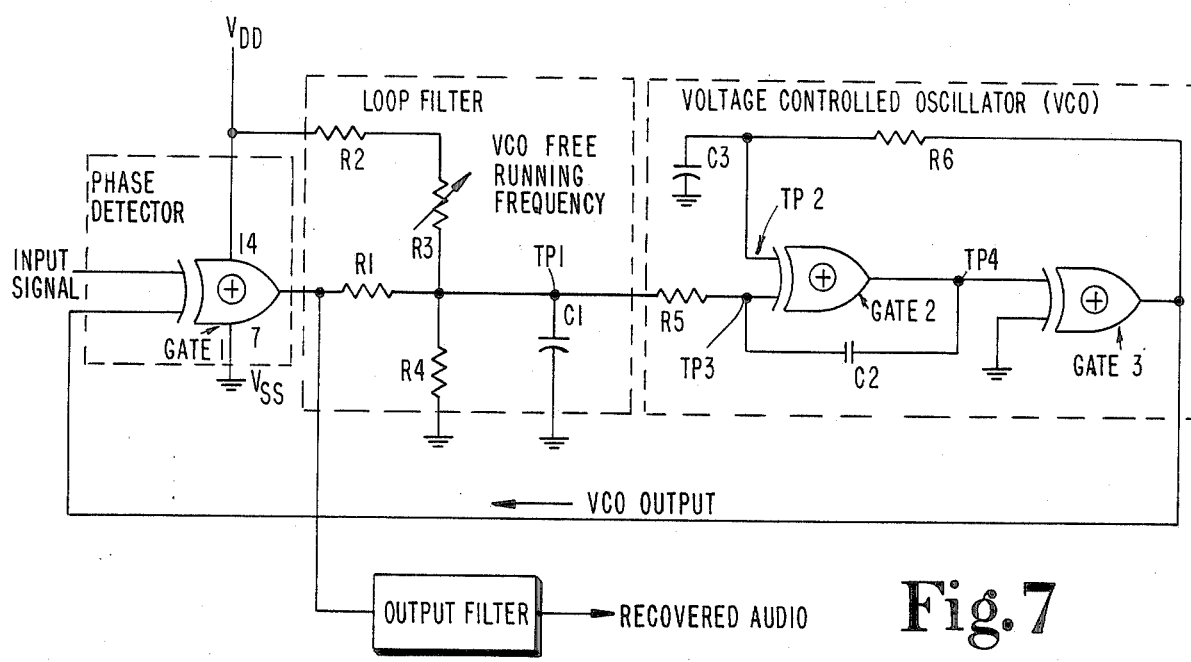
FIG. 7 is a schematic diagram of a phase lock loop FM demodulator according to a typical embodiment of the present invention.

The phase lock loop (PLL) circuit itself as shown in FIG. 7, is used in several locations in the transceivers of this invention. The particular PLL circuit according to the present invention, is a very low cost method of demodulating a frequency modulated carrier or subcarrier. This PLL circuit is completely constructed from one CMOS 4070B exclusive-OR gate package, five resistors, one potentiometer, and three capacitors. These parts entirely perform the functions of the three circuit blocks that typically describe a PLL. The circuit blocks are:

(1) Phase Detector (or phase comparator)
(2) Loop Filter
(3) Voltage controlled oscillator (VCO).

The phase detector function according to the present invention, is performed by a single exclusive-OR gate (gate 1, FIG. 7). The DC component of the output of gate 1 is dependent upon the phase difference between the input signal and the VCO output. This exclusive-OR gate functions similar to a limiter/balanced mixer combination, the latter being a standard method of construction of a PLL phase detector.

The loop filter function is performed by a passive RC circuit composed of three resistors, one potentiometer, and one capacitor (R1, R2, R3, R4, C1). The loop filter circuitry also functions as a biasing network for the VCO. The potentiometer R3 sets the VCO free-running frequency. The resistors R2 and R4 set the range of adjustment of the VCO free-running frequency. The resistor R1 primarily affects the loop gain and the frequency lock range of the PLL. The capacitor C1 combined with R1, R2, R3, and R4 acts as a low pass filter to reduce the AC component from the phase detector output.

Figure 8:
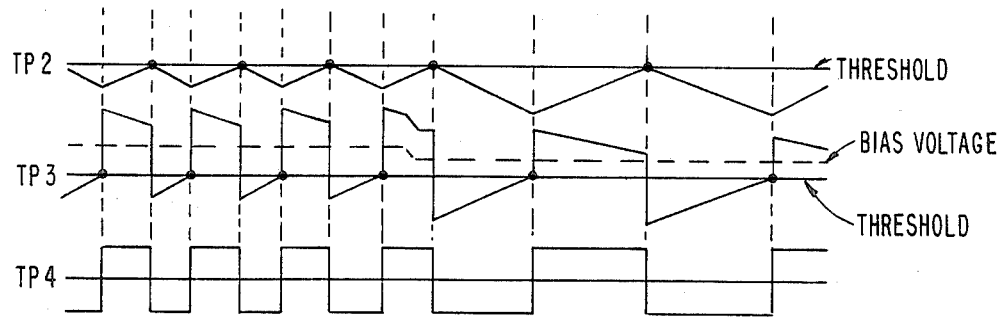
FIG. 8 is a picture of waveforms showing conditions at several test points in the circuit of FIG. 7.

The voltage controlled oscillator (VCO) is composed of two exclusive-OR gates, two resistors, and two capacitors. Its function is demonstrated in FIGS. 7 and 8. Whenever the test point TP2 (FIG. 7) voltage reaches the CMOS threshold voltage (approximately $\frac{1}{2} V_{DD}$ as referenced to $V_{SS}$) the gate 2 output TP4 is driven low causing both TP2 and TP3 to be driven below threshold. TP3 then will rise to the bias voltage as C2 is charged through R5. The bias voltage is supplied from the loop filter, whereas, the output of the phase detector affects this bias voltage through R1.

As the TP3 voltage reaches the threshold voltage, this drives the output TP4 high. This immediately causes the TP3 voltage to go considerably higher than threshold. It also causes the TP2 voltage to increase toward the threshold voltage as C3 is charged through R6. As the TP2 voltage reaches threshold the output TP4 again is driven low, as well as, the TP2 and TP3 voltages being driven below threshold. This completes an oscillation cycle, and is repeated continuously to produce a sustained oscillation.

The bias voltage at TP3 determines the VCO output frequency. The lower the bias voltage the lower the output frequency since it requires more time for the TP3 voltage to reach threshold as C2 is charged through R5. The bias voltage must be above the threshold voltage to sustain an oscillation. Gate 3 is only used as a buffer/gain element to square the output of gate 2 (TP4).

The output of a PLL usually requires filtering to remove the carrier and its harmonics. In FIG. 7 this filter is identified as the "output filter" block. The construction and complexity of this block is dependent upon the application.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

EXHIBIT A
COMPONENTS LIST - CARRIER CURRENT TRANSCEIVER

Rx Carrier = 194 KHz
Rx Subcarrier = 9.8 KHz
Tx Carrier = 361 KHz
Tx Subcarrier = 12.2 KHz

| | |
|---|---|
| C101 | .0068 ufd, 10%, UL Registered |
| C102 | .012 ufd, 10%, UL Registered |
| C103 | 680 pf, 5%, NPO to N220, Ceramic Disc, 50 V or 100 V |
| C104 | 560 pf, 20%, Z5U or better, Cer., Disc, 50 V or 100 V |
| C105 | 10 ufd, 20%, 16 V, Electrolytic Cap |
| C106 | 1000 pf, 20%, 50 V or 100 V, Z5U or better, Cer. Disc |
| C107 | 680 pf, 5%, NPO to N470, 50 V or 100 V, Ceramic Disc |
| C108 | 47 pf, 20%, NPO to N1500, 50 V or 100 V, Ceramic Disc |
| C109 | 10 ufd, 20%, 16 V, Electrolytic Cap |
| C110 | 47 pf, 20%, NPO to N1500, 50 V or 100 V, Ceramic Disc |
| C111 | .0022 ufd, 10%, 100 V, Mylar |
| C112 | .0047 ufd, 10%, 100 V, Mylar |
| C113 | 470 pf, 5%, Y5F or better, 50 V or 100 V, Cer. Disc |
| C114 | 560 pf, 5%, Y5F or better, 50 V or 100 V, Cer. Disc |
| C115 | 560 pf, 5%, Y5F or better, 50 V or 100 V, Cer. Disc |
| C116 | .0015 ufd, 10%, 100 V, Mylar |
| C117 | .033 ufd, 10%, 100 V, Mylar |
| C118 | .0033 ufd, 10%, 100 V, Mylar |
| C119 | 47 ufd, 20%, 10 V, Electrolytic Cap |
| C120 | .0022 ufd, 10%, 100 V, Mylar |
| C121 | .001 ufd, 10%, 100 V, Mylar |
| C122 | 680 pf, 10%, Y5F or better, 50 V or 100 V, Ceramic |
| C123 | .001 ufd, 10%, 100 V, Mylar |
| C124 | 68 pf, 10%, NPO to N1500, 50 V or 100 V, Ceramic Disc |
| C125 | .0022 ufd, 5%, 100 V, Mylar |
| C126 | .001 ufd, 5%, 100 V, Mylar |
| C127 | .001 ufd, 5%, 100 V, Mylar |
| C128 | 39 pf, 10%, NPO to N1500, 50 V to 100 V, Ceramic Disc |
| C129 | .047 ufd, 10%, 100 V, Mylar |
| C130 | .001 ufd, 10%, 100 V, Mylar |
| C131 | .022 ufd, 10%, 100 V, Mylar |
| C132 | .0022 ufd, 10%, 100 V, Mylar |
| C133 | 47 ufd, 20%, 10 V, Electrolytic Cap |
| C134 | 68 pf, 10%, NPO to N470, 50 V or 100 V, Ceramic Disc |
| C135 | .0047 ufd, 10%, 100 V, Mylar |
| C136 | 10 ufd, 10%, 16 V, Electrolytic Cap |
| C137 | 0.47 ufd, 10%, 100 V, Siemen's Polystack |
| C138 | 10 ufd, 10%, 16 V, Electrolytic Cap |
| C139 | .0047 ufd, 10%, 100 V, Mylar |
| C140 | .0015 ufd, 10%, 100 V, Mylar |
| C141 | 180 pf, 10%, Y5F or better, 50 V or 100 V, Cer. Disc |
| C142 | 270 pf, 10%, Y5F or better, 50 V or 100 V, Cer. Disc |
| C143 | .0068 ufd, 10%, UL Registered |
| C144 | .0068 ufd, 10%, UL Registered |
| C145 | 220 pf, 10%, Y5F or better, 50 V or 100 V, Cer. Disc |
| C146 | |
| C151 | 220 pf |
| C152 | |
| D101 | 151555, General Purpose Diode |
| D102 | 151555, General Purpose Diode |
| D103 | BB112, Varactor Diode |
| IC1 | 4069 UBE, Hex Inverter, CMOS |
| IC2 | 4070 BE, Quad, Exclusive-OR, CMOS |
| IC3 | 4070 BE, Quad, Exclusive-OR, CMOS |
| L101 | 150 uh, 7 mm adjustable coil |
| L102 | 980 uh, 7 mm adjustable coil |
| L103 | 750 uh, 7 mm adjustable coil |
| L104 | 390 uh, Taiyo Uden Type LALO4T |
| L105 | 1 mh, Taiyo Yuden type LALO4T |
| L106 | 1 mh, Taiyo Yuden type LALO4T |
| L107 | 120 uh, Taiyo Yuden type LALO4T |
| L108 | 1 mh, Taiyo Yuden type LALO4T |
| L109 | 56 uh, Taiyo Yuden type LALO4T |
| Q101 | 2N4126, PNP |
| Q102 | MPS 3392, NPN |
| Q103 | MPS 3392, NPN |
| R101 | 15K, 5%, ¼ Watt |
| R102 | 100 ohms, 5%, ¼ Watt |
| R103 | 150K, 5%, ¼ Watt |
| R104 | 8.2K, 5%, ¼ Watt |
| R105 | 10 Meg, 5%, ¼ Watt |
| R106 | 100 ohms, 5%, ¼ Watt |
| R107 | 10 Meg, 5%, ¼ Watt |
| R108 | 100K, 5%, ¼ Watt |
| R109 | 56K, 5%, ¼ Watt |
| R110 | 2.2K, 5%, ¼ Watt |

EXHIBIT A-continued
COMPONENTS LIST - CARRIER CURRENT TRANSCEIVER

| | |
|---|---|
| R111 | 5K, Miniature Trim Potentiometer |
| R112 | 4.7K, 5%, ¼ Watt |
| R113 | 4.7K, 5%, ¼ Watt |
| R114 | 62K, 5%, ¼ Watt |
| R115 | 7.5K, 5%, ¼ Watt |
| R116 | 120K, 5%, ¼ Watt |
| R117 | 2.2K, 5%, ¼ Watt |
| R118 | 5K, Miniature Trim Potentiometer |
| R119 | 33K, 5%, ¼ Watt |
| R120 | 47K, 5%, ¼ Watt |
| R121 | 10K, 5%, ¼ Watt |
| R122 | 10K, 5%, ¼ Watt |
| R123 | 47 ohms, 5%, ¼ Watt |
| R124 | 15K, 5%, ¼ Watt |
| R125 | 15K, 5%, ¼ Watt |
| R126 | 15K, 5%, ¼ Watt |
| R127 | 470K, 5%, ¼ Watt |
| R128 | 470K, 5%, ¼ Watt |
| R129 | 15K, 5%, ¼ Watt |
| R130 | 15K, 5%, ¼ Watt |
| R131 | 8.2K, 5%, ¼ Watt |
| R132 | 220K, 5%, ¼ Watt |
| R133 | 1 meg, 5%, ¼ Watt |
| R134 | 3.3K, 5%, ¼ Watt |
| R135 | 20K, Miniature Trim Potentiometer |
| R136 | 100K, 5%, ¼ Watt |
| R137 | 8.2K, 5%, ¼ Watt |
| R138 | 8.2K, 5%, ¼ Watt |
| R139 | 220 ohms, 5%, ¼ Watt |
| R140 | , 5%, ¼ Watt |
| R141 | 22K, 5%, ¼ Watt |
| R142 | 100 ohms, 5%, ¼ Watt |
| R143 | 680K, 5%, ¼ Watt |
| R144 | 1K, 5%, ¼ Watt |
| R145 | , 5%, ¼ Watt |
| R146 | 10K, 5%, ¼ Watt |
| R147 | , 5%, ¼ Watt |
| R148 | |
| T101 | Turns ratio Pri/Sec. = 19, Primary resonates with 685 pf across primary at 194 KHz, 7 mm adjustable. |
| T102 | Turns ratio Pri/Sec. = 32, Primary tap turns ratio = 7.3, Primary resonates with 275 pf across primary at 361 KHz, 7 mm adjustable. |

The invention claimed is:

1. A method of information transmission on transmission line means and comprising the steps of:
   encoding an information signal upon a subcarrier signal by means of frequency modulation of that subcarrier, and
   encoding the subcarrier signal upon a carrier signal by frequency modulation of the carrier.

2. The method of claim 1 and further comprising the step of:
   outputting the modulated carrier signal to AC power circuits in a building.

3. The method of claim 2 and further comprising the steps of:
   plugging a receiver into a socket of at least one of the AC power circuits and demodulating the carrier and the subcarrier to recover the information signal.

4. The method of claim 3 and further comprising the step of:
   providing the recovered information signal at a telephone jack on the receiver.

5. The method of claim 4 and further comprising the steps of:
   connecting a telephone set to the jack;
   generating a subcarrier signal and a carrier signal at a unit plugged into said socket;
   taking the audio signals generated by audio inputs at the telephone set, and encoding them upon the subcarrier signal generated at said unit plugged into said socket, by means of frequency modulation of that subcarrier in said unit;

encoding of the subcarrier signal generated at said unit upon the carrier signal generated at said unit, by frequency modulation of the carrier in said unit, to produce an output; and connecting said output to said socket for transmission on the AC power circuits of the building.

6. The method of claim 1 and further comprising the step of:

generating the subcarrier signal and carrier signal at a unit coupled to the AC wiring in a building.

7. The method of claim 6 wherein the steps of generating include:

establishing a subcarrier frequency between 8 KHz and 15 KHz; and establishing a carrier frequency between 100 KHz and 550 KHz.

8. The method of claim 6 and further comprising the steps of:

using the subcarrier signal for a pilot tone.

9. The method of claim 8 and further comprising the step of:

detecting the pilot tone at a base unit coupled to the AC circuit in the building and to a telephone line into the building, with the step of generating the subcarrier signal being done at a location remote from the said base unit.

10. The method of claim 9 and further comprising the step of:

generating the pilot tone in a remote unit coupled to the AC wiring in the building.

11. In an area having an AC electrical power service, a plurality of electrical outlets at various locations in the area, said outlets being coupled by electrical conductors to said service and thereby energized with AC power, the improvement comprising:

a communication line;

a first transceiver having a transmitter section and a receiver section, said transceiver being coupled to said service to thereby apply signals to and receive signals from at least some of said outlets, said transmitter section having signal input means and signal output means, first interface means coupling information signals from said communication line to said transmitter section input means, said signal output means of said transmitter section being coupled to said service, said transmitter section having means coupled to said input means and output means thereof for reception of said information signals and frequency modulation of a subcarrier thereby, and frequency modulation of a carrier by the modulated subcarrier, and delivery of the resulting modulated carrier to said transmitter section output means for delivery to said service, said receiver section having input and output means, said receiver section input means being coupled to said service, and said first interface means coupling said receiver section output means to said communication line, said receiver section having means coupled to said input and output means thereof for first and second demodulation of a signal from said service and delivering a resulting information signal output through said interface means to the said communication line.

12. The improvement of claim 11 and further comprising:

an additional transceiver, said additional transceiver having a transmitter section and a receiver section, said transmitter section of said additional transceiver having signal input means and signal output means, said signal output means thereof being coupled to said service, said transmitter section of said additional transceiver having means therein coupled to said input means and output means thereof for reception of an information signal input from a second communication line and frequency modulation of a subcarrier by said information signal input and frequency modulation of a carrier by the frequency modulated subcarrier, and delivery of the resulting modulated carrier to said output means of said transmitter section of said additional transceiver for delivery to said service, said receiver section of said additional transceiver having signal input means and output means, said signal input means thereof being coupled to said service, and said receiver section of said additional transceiver having means therein coupled to said signal input and output means thereof for double demodulation of a signal from said service to produce a resulting information signal and deliver the resulting information signal to the said signal output means thereof.

13. The improvement of claim 12 wherein:

said first and additional transceivers are coupled to said service by means plugged into outlets of said plurality of AC power energized outlets.

14. The improvement of claim 12 and further comprising:

further additional transceivers having the features and couplings as set forth in claim 21 for said additional transceiver, the couplings of said further additional transceivers to said service being effected by means plugged into various outlets of said plurality of AC power energized outlets.

15. The improvement of claim 12 and further comprising:

an information using device, said signal output means of said receiver section of said additional transceiver being coupled to said information using device.

16. The improvement of claim 15 wherein:

said information using device is a speaker of a telephone, said additional transceiver being located in said telephone.

17. The improvement of claim 15 wherein:

said signal output means of said receiver section of said additional transceiver include a telephone jack for connection thereto of a standard telephone, said information using device being a standard telephone plugged into said jack.

18. The improvement of claim 11 wherein:

said area is in a building and said communication line is an external telephone line into the building and said outlets are in various rooms of the building.

19. The improvement of claim 11 and wherein:

said transmitter section further includes means for generating said subcarrier and means for generating said carrier.

20. The improvement of claim 19 and wherein:

said subcarrier generating means includes said means for modulation of said subcarrier with said information signals, and said carrier generating means include said means for modulation of said carrier for using said modulated subcarrier to modulate said carrier.

21. The improvement of claim 19 wherein:

said subcarrier generating means generates a subcarrier of a frequency between 8 KHz and 15 KHz and said carrier generating means generates a carrier of a frequency between 100 KHz and 500 KHz.

22. The improvement of claim 19 wherein said first interface means include a ring detector output, the improvement further comprising:

ring tone generator means having an input coupled to said ring detector output, and a ring tone output coupled to said transmitter section signal input means for modulation of said subcarrier and carrier and delivery of a ring signal to said service.

23. The improvement of claim 22 wherein:

said carrier generating means of said transmitter section include an input coupled to said ring detector output, to turn on said transmitter section in respons to detection of a ring condition by said first interface means.

24. The improvement of claim 19 and further comprising:

pilot tone detector means having an input coupled to said receiver section to detect a pilot tone subcarrier from the first demodulation of the signal from said service, and having an output, said carrier generating means of said transmitter section including an input coupled to said pilot tone detector means output to turn on said transmitter section in response to detection of a pilot tone subcarrier on said service.

25. The improvement of claim 24 and further comprising:

an additional transceiver, said additional transceiver having a transmitter section and a receiver section, said transmitter section of said additional transceiver having signal input means and signal output means, said signal output means thereof being coupled to said service, said transmitter section of said additional transceiver having means therein coupled to said input means and output means thereof for generating a subcarrier, modulating the subcarrier with information received on said input means thereof to produce a modulated subcarrier, generating a carrier, modulating the carrier with the modulated subcarrier to produce a modulated carrier and delivery of the modulated carrier from said signal output means thereof to said service, the subcarrier generated by said transmitter section of said additional transceiver being the pilot tone detected by said pilot tone detector means.

26. The improvement of claim 25 and further comprising:

hook switch control means in said interface means and having an input coupled to said pilot tone detector means to seize the communication line in response to detection of said pilot tone.

27. The improvement of claim 26 and further comprising:

on-hook/off-hook switch means coupled to said transmitter section of said additional transceiver to turn on said transmitter section in response to an off-hook condition.

28. The improvement of claim 27 and further comprising:

telephone means operatively associated with said switch means.

* * * * *